Dec. 5, 1933.   C. J. BIVER   1,938,208
THERMIONIC TUBE POWER CONVERTER
Filed Feb. 24, 1932
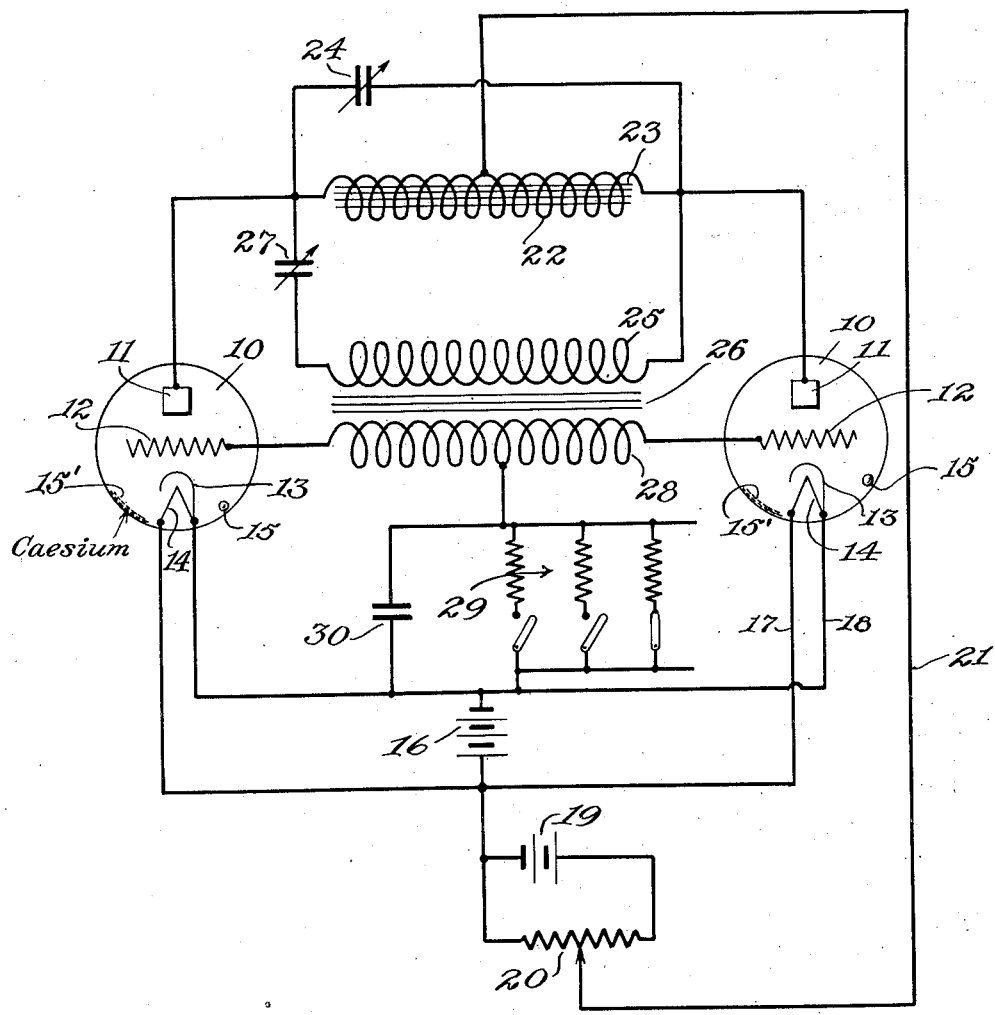
Inventor
Carl John Biver
By Charles W. Hills
Attorney Patented Dec. 5, 1933

1,938,208

UNITED STATES PATENT OFFICE 1,938,208

THERMIONIC TUBE POWER CONVERTER

Carl John Biver, Owensboro, Ky., assignor to The Ken-Rad Corporation, Owensboro, Ky., a corporation of Kentucky Application February 24, 1932. Serial No. 594,936

15 Claims. (Cl. 171—97)

It is a primary object of the invention to provide means whereby power may be converted so that a high voltage direct current load may be supplied from a low voltage direct current source.

The figure illustrates schematically a preferred arrangement of instrumentalities employed in carrying out the invention.

As shown in the drawing:

The numerals 10 indicate generally thermionic tubes of the vapor type in which there is present inert gas, such as caesium, and a mercury vapor, and which tubes are generally known as electrostatically controlled arc rectifiers, or more simply as vapor tubes. Such tubes will be hereinafter referred to simply as vapor type tubes.

Each tube has an anode 11, a control grid 12, an electron emitting cathode 13, and a heater 14. A drop of mercury 15 is placed in the tube to provide a source of mercury vapor in a manner well understood in the art, and a quantity of caesium 15' may also be added to provide a source of caesium vapor. The heater 14 is shown energized by a battery 16, through conductors 17 and 18, and the cathode 13 is connected to the negative terminal of the battery through the conductor 18.

The anode-cathode circuit is energized by a battery 19, and the anode potential is adjusted by a potentiometer 20 connected across the terminals of the battery 19.

It will be obvious that the anode potential may be varied by simply varying the number of cells in the anode battery. While the heater is shown as energized by a battery, it is common knowledge that it may be equally well heated by an alternating current, when the anode and grid circuits are separated from the heater circuit, or, at most, connected to a common ground if the heater circuit is grounded. The battery 19 is connected to the anode 11 of each tube by a conductor 21 connected to the mid-point of a coil 22 of an inductance indicated generally by the numerals 23. The coil 22 is wound on a laminated steel core having a closed magnetic circuit.

The opposite ends of the coil 22 are connected, respectively, to the anodes 11 of the vapor tubes 10. The coil 22 is shunted by a variable condenser 24. The primary 25 of a transformer 26 is connected across the ends of the coil 22 with a blocking condenser 27 in series. The opposite ends of the secondary 28 of the transformer 26 are connected to the grids 12 of the tubes 10 to impress a suitable high potential upon the grids. The direct current load circuit 29 is connected between the mid-point of the secondary 28 of the transformer 26 and the cathode 13 of the tubes, and because of the well known characteristic of the vapor discharge, or arcs, there is obtained a "full-wave" rectification of the alternating current in the secondary 28 with consequent flow of a unidirectional current in the load circuit.

The manner in which the vapor type tube generates alternating currents because of its coupled anode and grid circuits having inductance and capacitance is now well known in the art. Such tubes have long been used as generators in the radio art, and as rectifiers of alternating currents.

The present invention, however, is characterized by the use of a power converter to convert energy from a low voltage direct current source to supply a high voltage direct current load circuit, making use of the vapor tube as a generator and as a rectifier with the load supply circuit connected between the grid and cathode of the tube.

It will be evident that the invention is applicable to conditions in which it is desirable that a low voltage supply for electroplating, and the like, be obtained from a high voltage direct current source. It has been found advantageous to generate alternating currents at relatively high frequencies compared with commercial power supply frequencies. It is evident that the higher the ripple frequency of the unidirectional current the easier it is to filter this direct current supply.

While it is economical to wind the coil 22 of the reactor 23 on a closed core of a suitable quality of steel, it will be understood that the necessary reactance for the generation of currents at desired frequencies may be otherwise obtained with due regard to the energy losses in such reactors occasioned by the current impulses.

It has been found advantageous to connect a capacitor 30 in parallel with the direct current load to promote the stability of operation of the tubes, and for a reason which appears in a copending application of Carl John Biver, Serial No. 594,938, filed Feb. 24, 1932.

It has heretofore been accepted practice to connect the load circuit between the anode and the cathode of the tube in electron or non-gaseous tubes, and in tubes of the vapor type as herein defined. It is also known that the load circuit has been connected between the grid and the cathode in tubes of the mercury vapor arc rectifier type in which a pool of mercury is the cathode. However, I believe I am the first inventor of the converter herein described in which a vapor tube having a heated cathode of the coated type as an emitter of electrons in conjunction with an ionizable vapor is employed, thereby making possible the use of a low voltage current source, increased stability of operation, low cost, portability, and economy of space. The converter of my invention is therefore well adapted for use in connection with moving vehicles, and in portable radio receiving apparatus.

I am aware that many changes may be made and numerous details of construction may be varied through a wide range without departing from the principles of this invention, and I therefore do not purpose limiting the patent granted thereon otherwise than necessitated by the prior art.

What is claimed is:

1. In combination, a plurality of tubes of the vapor type each being provided with an anode, a cathode electron emitter, a control grid and an ionizable vapor, electrical energy storing means connecting the anodes of the tubes, a transformer having its primary connected to the anodes of the tubes and having its secondary connected to the control grids of the tubes, a source of direct current connected to the anodes and to the cathodes of the tubes, and a direct current load circuit connected to the secondary of the transformer and to the cathodes of the tubes.

2. In combination, a plurality of tubes of the vapor type each being provided with an anode, a cathode electron emitter, a control grid and an ionizable vapor, a source of direct current connected to the anodes and to the cathodes of the tubes, circuit means coupling the anodes and the grids of the tubes for the production of alternating currents and rectification of the alternating currents, said circuit means including a coil having its ends connected to the control grids, and a direct current load circuit connected to said coil and to the cathodes of the tubes.

3. In combination, a plurality of tubes of the vapor type each being provided with an anode, a cathode electron emitter, a control grid and an ionizable vapor, a direct current source, oscillatory circuit means connecting said tubes and said source for the production of alternating currents, a direct current load circuit, and a reactor connecting said load circuit and the grids of the tubes.

4. In combination, a tube of the vapor type having an anode, a cathode electron emitter, a control grid and an ionizable vapor, a direct current source, oscillatory circuit means connecting said tube and said source for the production of alternating currents, a direct current load circuit, and a reactor connecting said load circuit and said control grid.

5. In combination, a direct current source, a direct current load circuit, a pair of vapor type tubes each being provided with an anode, a cathode electron emitter, a control grid and an ionizable vapor, means connecting said anodes to said source, a transformer having one winding connecting said anodes and having another winding connecting said grids, said load circuit being connected to said another winding at the electrical mid-point thereof.

6. In combination, a direct current source, a vapor electric discharge device having an anode, a cathode electron emitter, a control grid and an ionizable vapor, oscillatory circuit means connecting said device and said source, and a direct current load circuit connected to said grid and said cathode.

7. In combination, a vapor electric discharge tube provided with an anode, a cathode electron emitter, a control grid and an ionizable vapor, means magnetically coupling the anode and the grid, a direct current source connected in the anode circuit of the tube, a direct current load circuit connected in the grid circuit of the tube, said coupling means being cooperable with said current source and said tube to produce alternating currents and rectification of the produced current.

8. The method of transforming direct current from one voltage to another to transfer energy from a source at one voltage to a load circuit at another voltage, which method consists in causing direct current at one voltage to flow between electrodes in a vapor electric discharge of electrons and ions in circuits containing energy storing elements, modifying the discharge to produce alternating currents in the circuits and rectification of the produced currents, and transferring unidirectional current to a load circuit at a voltage other than that of the source.

9. Means for transforming direct current from one voltage to another comprising a vapor electric discharge device having an anode, a cathode electron emitter, a control grid and an ionizable vapor, circuits having energy storing elements connected to said device to produce generation of alternating currents and rectification of alternating current in the circuits, and an energy absorbing load circuit connected to the grid and to the cathode of said device.

10. Means for transforming direct current from one voltage to another comprising a vapor electric discharge tube having an anode, a cathode electron emitter, a control grid and an ionizable vapor, circuits containing energy storing elements connecting said anode and said grid and said cathode, a source of direct current connected in the anode circuit of said tube, and a direct current load circuit connected in the grid circuit of said tube.

11. In combination, a direct current load circuit, a direct current source, a pair of thermionic tubes each having an anode, a cathode, and a control grid, inductive coil means magnetically coupling said anodes and said grids, circuit means associated with said anodes, said cathodes and said control grids, said direct current source being connected in the anode circuit of said tubes, said load circuit being connected in the grid circuit of said tubes.

12. In combination, a thermionic tube having an anode, a cathode and a control grid, a direct current source connected in series with reactor means to the anode and cathode of said tube, and a direct current load circuit connected to the grid and cathode of said tube.

13. In combination, a plurality of tubes of the vapor type, each being provided with an anode, a cathode, a control grid and an ionizable vapor, electrical energy storing means connecting the anodes of the tubes, a transformer having a winding conductively connected to the control grids of the tubes and having another winding capacitively coupled to the anodes of the tubes, and a direct current load circuit connected to said first-named winding and to the cathodes of the tubes.

14. Means for transforming direct current from one voltage to another comprising a vapor electric discharge device having a cathode electron emitter, an anode, a control grid and an ionizable vapor, a direct current source of energy connected to the anode and to the cathode of said tube, circuits having energy storing elements connected to said device and to said source to produce generation of alternating currents and rectification of alternating current in said circuits, and an energy absorbing load circuit connected between said cathode and said control grid to receive energy from said direct current source at a voltage other than that of said source.

15. The method of transforming direct current from one voltage to another to transfer energy from a direct current source at one voltage to direct current in a load circuit at another voltage, which method comprises causing direct current at one voltage to flow between electrodes in a vapor electric discharge device having connected energy storing elements, interposing a control electrode in the path of said current, modifying the current flow to produce alternating currents and rectification of the produced currents, and interposing a load circuit between the control electrode and one of said first-named electrodes.

CARL JOHN BIVER.